United States Patent [19]
Magliocca

[11] Patent Number: 6,068,707
[45] Date of Patent: May 30, 2000

[54] PORTABLE PARTS WASHING APPARATUS WITH CENTRIFUGAL FILTER

[76] Inventor: Charles T. Magliocca, 616-112th St. East, Tacoma, Wash. 98445

[21] Appl. No.: 09/105,777

[22] Filed: Jun. 26, 1998

Related U.S. Application Data

[63] Continuation-in-part of application No. 08/783,692, Jan. 15, 1997, Pat. No. 5,954,071.
[60] Provisional application No. 60/050,827, Jun. 26, 1997.

[51] Int. Cl.$^7$ ........................................... B08B 7/04
[52] U.S. Cl. ........................... 134/10; 134/25.4; 134/111; 134/201
[58] Field of Search ...................... 134/109, 110, 134/111, 201, 10, 25.4; 68/23, 18 F; 210/360.1; 494/36

[56] References Cited

U.S. PATENT DOCUMENTS

| | | |
|---|---|---|
| 1,385,724 | 7/1921 | Smith et al. . |
| 2,085,075 | 6/1937 | Delano . |
| 2,785,999 | 3/1957 | Ruthner . |
| 3,200,622 | 8/1965 | Brucken . |
| 3,378,018 | 4/1968 | Lawter . |
| 3,960,728 | 6/1976 | Otzen . |
| 5,368,653 | 11/1994 | Russell . |

*Primary Examiner*—Frankie L. Stinson
*Attorney, Agent, or Firm*—Robert B. Hughes; Hughes & Schacht, P.S.

[57] ABSTRACT

A portable parts washing machine using a washing solvent to wash motor parts or the like. The apparatus has a stowed configuration and an operating configuration. In the operating configuration, a solvent container/wash basin is positioned on a base section which also functions as a solvent reservoir. Solvent is recirculated by a pup and recirculating line fro the reservoir to the wash basin, with the solvent washing the parts and then flowing through a drain in the wash basin into a centrifugal filter. The centrifugal filter removes the contaminates, with the solvent returning to the reservoir. In the stowed configuration, the base section, centrifugal filter and solvent recirculating assembly are stowed in the container.

21 Claims, 7 Drawing Sheets

PORTABLE PARTS WASHING APPARATUS WITH CENTRIFUGAL FILTER

This application is a continuation-in-part of application Ser. No. 08/783,692 for a Portable Parts Washing Apparatus With Centrifugal Filter, filed Jan. 15, 1997 now U.S. Pat. No. 5,954,071 the contents of which are incorporated herein by this reference, and also claiming the priority of U.S. Provisional application 60/050,827 filed Jul. 26, 1997 entitled "PORTABLE WASHING APPARATUS WITH CENTRIFUGAL FILTER".

BACKGROUND OF THE INVENTION

1. Field of the Invention

This invention relates generally to the field of portable parts washing apparatus, and particularly to a portable parts washing apparatus having a centrifugal filter to separate foreign waste elements from a cleaning solvent.

2. Background Art

Parts washers are widely used in industrial applications, and in particular, automotive service shops. The most familiar part washer can be found in almost any service station in the country. It is comprised of a sink with a spigot and a drain that sits upon a standard 55 gallon drum. The drum is partially filled with a parts washing solvent. The solvent is pumped from the drum, through the spigot, where it flows over the dirty part, into the sink's drain, from which it falls back into the drum. In this manner, the solvent continuously flows over the dirty part while the operator washes the part in the sink.

There has long been an unmet need for a portable parts washer that can be easily moved to a field location, An example of such an unmet need is military deployment. Military equipment in use in the field requires maintenance that cannot be done in a regular service shop either because of logistics or simply convenience. A portable parts washer would also be useful for applications outside of the military. For example, repairing and maintaining heavy machinery on site of a construction project or at a logging camp. It has been impractical to move parts washers to the field because of their size, weight, and configuration. As a substitute for this very useful device, a parts washer in the field consists of a bucket filled with solvent in which a part is dipped and washed by hand. The bucket is emptied when the solvent becomes saturated with dirt. This practice is inefficient, wasteful, and environmentally hazardous.

Despite the multitude of advantages over the bucket method that the basic configuration of the parts washer (sink, barrel and solvent moving means) has, it is believed that few, if any, conventional parts washers are used during a military deployment. This is largely because conventional parts washers are impractical to move and take up much more cargo space than justifies their use. The sink portion of the conventional parts washers are made of steel for fire safety reason and are therefore very heavy. In addition, a typical 55 gallon drum half-filled with solvent could easily weigh several hundred pounds. Since the pump of these conventional parts washers is most often suspended from below the sink, damage during transport is very likely. Exposed this way, it is almost certain that the bracket, the pump, the hoses, or any combination of the three would be damaged. The parts washer would also take up a great deal of space, space that is at a premium on a military deployment.

Of the many patents discussed below that are concerned directly with parts washers, only U.S. Pat. No. 4,462,415 (Otzen) even teaches a solvent tank designed to be taken to a reclamation facility to be exchanged for fresh solvent. This patent describes a low cost parts washer intended for use by the occasional user and adapted for self-service fluid changes. The unit has a modular solvent tank of modest capacity that can be removed from the parts washer, capped in several places, and returned to a distributor for exchange with a solvent tank containing fresh solvent. There is no filtering means inside the solvent tank.

In addition to being impractical to move, the problem with conventional parts washers is that the foreign material washed from the dirty part flows into the drum along with the solvent. In many applications, the foreign material will be comprised of metal shavings, dirt, sand, grit, and oil particulates. Since much of this debris will remain suspended in the solvent while the pump is running, the pump is continuously subjected to substances that will damage its internal seals. Much of the background art in this area has addressed this particular problem by placing a filter upstream of the pump to strain the foreign debris from the solvent before it reaches the pump. For instance, in U.S. 4,056,114 (Boutillete), the pump is surrounded by a filter element. U.S. Pat. No. 3,890,988 (Lee) teaches a pump mounted at the top of a truncated cone that rests at the bottom of a solvent tank. The cone is made from a screen that is intended to filter the solvent before it reaches the inlet of the pump. U.S. Pat. No. 5,464,533 (Koslow) teaches a two stage active filter that is located inside an extended pump housing. Instead of having the filter continuously in line with the pump, U.S. Pat. No. 5,368,653 (Russell) teaches a filter that can be periodically used at the discretion of the user.

Trapping the gunk and the solvent together until the solvent drains from the filter, however, insures that the gunk will retain a substantial amount of the solvent. This wet waste material will eventually condense into a thick, gummy, oily substance, commonly referred to in the art as "gunk."

In U.S. Pat. No. 3,378,019 (Riolo et al.) the patent teaches a paper filter located below the drain. The solvent flows through the filter with only the assistance of gravity. Similarly, in U.S. Pat. No. 3,960,728 (Otzen) a filter bag is described that hangs from the drain. U.S. Pat. No. 5,522,814 (Olson) teaches a gravity filter comprising a compartment filled with waste cotton located below the drain. U.S. Pat. No. 2,675,012 (Scales) notes that these types of gravity filters are quickly obstructed by the gunk and will not filter the solvent. Accordingly, Scales teaches a complex set of superposed sludge settling trays of successively decreasing diameters. In U.S. Pat. No. 4,226,548 (Reith) the sludge trap is located under a screen that covers the interior bottom of the sink. The solvent flows over a ridge to a drain while the sediment settles on the other side of the ridge.

Other techniques proposed include skimming the waste materials that float on top of an aqueous cleaning solution as is taught in U.S. Pat. No. 5,303,725 (Hilgren), or simply distributing the solvent as it drains so it does not upset the sediment that has collected at the bottom of the drum as is described in U.S. Pat. No. 4,505,284 (Kyatt). U.S. Pat. No. 2,085,075 (Delano) teaches a portable crankcase flusher and cleaner that introduces, extracts, and filters cleaning fluid from the crankcase of an automobile using a complicated reversible one-way valve. Solvent is introduced to the crankcase, removed and cycled trough a centrifuge, and returned to the crankcase several times. The second major effect of the foreign matter flowing freely into the drum along with the solvent is that, as the foreign material settles to the bottom of the drum it will accumulate and condense into gunk. This gunk layer will eventually foul, and probably damage, the pump. In any case, the solvent in the drum will eventually be so full of gunk and suspended matter that it will have to be replaced and the old solvent disposed of In the age before hazardous waste laws, this problem was addressed in the art by using plastic drum liners that would capture the solvent, the foreign materials, and the gunk so that they could all be disposed of together—probably ending up in a landfill (assuming the liner made it that far without being punctured). This disposable liner concept is taught in U.S. Pat. No. 3,890,988 (Lee). U.S. Pat. No. 3,552,814 (Olson); U.S. Pat. No. 4,056,114 (Boutilette).

Contrary to a suggestion in the Lee patent, it is no longer possible to remove the gunk and solvent together in a plastic liner to be disposed of in a landfill or, for the matter, in the dirt behind the service station. The solvents used in parts washers are now classified as hazardous waste materials and are heavily regulated by both state and federal law. There are severe civil and criminal penalties for the improper disposal of the waste materials associated with these parts washers. Similarly, it is no longer practical to clean the gunk from the parts washers because the gunk still has to be disposed of as hazardous waste.

Because of the hazardous waste laws, a huge industry has developed to service parts washers. The 1995 annual report from the largest of these service providers reports reclaiming more than 210 million gallons of contaminated fluids and discloses revenues in this area are in excess of $240 in dollars per year. Servicing the parts washers usually means removing the sink from the drum, capping the used drum off, and transporting the used solvent and gunk contained in the drum to a reprocessing plant.

Evidencing the major concern that the industry has over hazardous waste liability, this service provider also advertises that it indemnifies the customer against liability hazardous waste spills that may occur while the solvent is being transported.

In the portable applications such as is described in the present application, the significance of the environmental concerns often comes second to the need for the solvent to remain mostly waste free for relatively long periods of time under heavy use. In the example of a military deployment, the fewer parts washers that need to be deployed, the less the supply lines are burdened. It is axiomatic that the fewer parts washers available in the field, the harder they will be used.

Perhaps most importantly, many of the designs discussed above rely on the solvent tank remaining stationary so that the waste materials settle to the bottom of the tank where they are out of the way. The motion inherent in moving the solvent tank from one location to another would freely mix the waste materials back into the solvent, making many of the methods involved in the previous patents ineffective, and the moving of the conventional parts washer to another location almost useless.

SUMMARY OF THE INVENTION

The primary components of the present invention are a container, a base assembly, a solvent recirculating means, and a centrifugal filter assembly. When in use as a parts washer, the lower portion of the container is used as a sink and the upper portion of the container is used as a fire suppression lid. The container assembly rests upon the base assembly which houses the solvent, solvent recirculating means and the centrifugal filter assembly. The solvent recirculating means is connected to a nozzle and hose assembly inside the sink by a quick-disconnect hose specially configured for that purpose.

To configure the present invention for transport, the quick disconnect hose is removed from its connections to the sink and the base assembly. The container assembly is then lifted from the base assembly. The base assembly is capped and then placed into the container assembly. The quick-disconnect hose is placed alongside the base assembly, as is the nozzle and hose assembly inside the sink. The cover portion of the container assembly is then lowered and temporarily secured to the sink portion. The portable parts washer is then carried to the next location by the handles placed on the is outside of the container assembly for that purpose. Setting up the portable parts washer is this same process in reverse—open the container assembly, remove the base assembly and uncap it, place the container housing on top of the base assembly, and connect the quick-disconnect hose.

In the preferred embodiment of the invention, a centrifugal filter assembly is incorporated into the base assembly. This is because of the problem of keeping the solvent clean that is described by many of the patents discussed above. These patents all describe their methods of addressing the same problem—separating and removing the gunk from the solvent. The portable parts washing apparatus of the present invention significantly reduces this problem in a manner significantly more effective than what has been available, and the hazardous waste problems associated with parts washers, by materially reducing the formation of the gunk by reducing the foreign waste material that reaches the solvent tank. This is done by employing a centrifugal filter assembly between the drain of the container assembly parts washing basin and the solvent storage tank. In this position, the centrifugal filter removes most of the foreign particulate matter from the solvent before the solvent is returned to its storage container. More importantly, however, is that the centrifugal filter removes the foreign waste material from the solvent before it can condense into the paste-like gunk at the bottom of the solvent storage tank. Instead, the centrifugal action of the filter squeezes the solvent from the foreign waste materials while the foreign waste material is still a small part of the solvent stream. A purified solvent is returned to the container, while the mostly-dried foreign matter is retained in the filter. In the preferred form, a secondary "screen" filter is used at the drain of the basin to capture larger foreign objects, including components that may fall off the part being washed. These filtering means enable the solvent to be recirculated almost indefinitely while remaining mostly free of gunk formation.

It is important to note that most of the foreign material is captured by the primary centrifugal filter, leaving a relatively clean solvent for reuse. In particular, the centrifugal filters solves the problems associated with gunk accumulating at the bottom of a tank. The centrifugal action of the primary centrifugal filter spins most of the solvent out of the foreign material, leaving behind a body of foreign materials captured in the filter that is almost dry. Instead of capping off the whole solvent drum and sending it for reprocessing, the only material that need be sent to a hazardous waste facility are the disposable filters and their contents, which can easily be placed in a canister the size of a coffee can. This means that shipping and waste disposal fees will be significantly less, the danger of a hazardous waste spill will be considerably reduced, and the cost of replacing the solvent will almost be eliminated for most applications.

In portable applications, the centrifugal filter keeps most of the contaminants out of the solvent, so the problem of settled contaminates remixing with the solvent during transport is also considerably lessened.

To present further aspects of the present invention, the apparatus of the present invention can be considered as comprising a containing section and a base section. The containing section comprises a containing member defining a containing chamber. The containing chamber functions in a first configuration (the stowed configuration) as a stowing container, and functions in the second configuration (the operating configuration) as a wash basin having a parts and solvent containing region. The containing member has a drain configured to retain parts in the container to permit solvent to pass through the drain.

The base section is configured to be positioned in the containing chamber of the containing member in the first stowed configuration, and also configured and arranged to function in the second operating position as a base support for the containing member and also a solvent reservoir. The base section defines a solvent containing region positioned below the containing section in the second configuration. The centrifugal filter in the first configuration is stowed in the containing member and in the second configuration it is positioned to receive the solvent from the drain. The centrifugal filter comprises a rotatably mounted filter receptacle with filter means to retain impurities from the solvent in the receptacle and permit the solvent to flow through the filter means and into the solvent reservoir.

There is a recirculating assembly which comprises a pump and recirculating line means. It is arranged so that in the operating configuration the pump moves the solvent from the solvent containing region through the recirculating line means to the wash basin of the containing member and in the first stowed configuration is in the containing member.

In the preferred form, the containing section further comprises a cover member which in the stowed configuration functions as a cover for the containing member. In the operating configuration, the cover member is movable from an open position to a closed position to be able to function as a flame suppresser.

The containing member and the base member have interfitting positioning means by which the containing member can be properly positioned on the base section in the operating configuration. More specifically, the base section has an upper end opening, and the containing member has at its lower end a downwardly extending interfitting member which interfits with an upper end portion of the base section. Desirably, the interfitting member comprises a circumferential collar fitting within the base section, and in the operating configuration the centrifugal filter is located in the area surrounded by the collar, so that solvent discharged from the centrifugal filter can be contained by the collar.

The interfitting member extends downwardly from the containing member, and the containing member has support means extending downwardly from the containing member to properly support the containing member above a ground location.

The centrifugal filter is mounted in the reservoir so that with the apparatus in its second operating configuration, the centrifugal filter is positioned in the base section beneath the drain of the containing member to receive the solvent from the drain. The centrifugal is arranged to be able to remain in its position in the base section when the base section is removed from the containing member and stowed in the containing member.

In one configuration, the pump comprises a pump motor, and the pump motor has an operative drive connection to the centrifugal filter to cause the centrifugal filter to rotate. In one form, the centrifugal filter is mounted to a mounting structure, and the motor has shaft means extending to the mounting structure. There is a drive connection extending between the shaft and the centrifugal filter to cause rotation of the centrifugal filter. In the specific form, the drive connection comprises belt and pulley drive means operatively interconnecting the shaft and the motor of the centrifugal filter.

In another arrangement, the centrifugal filter is provided with a fluid driven drive means to cause rotation of the centrifugal filter. The pump is arranged with a fluid supply line to deliver solvent to the fluid drive means to cause rotation of the centrifugal filter. In the specific form shown herein, the fluid drive means comprises a turbine means which is driven by solvent that is driven from the pump. In the method of the present invention, the components Are provided as indicated above. Initially, in the stowed position the base section is positioned in the containing member, along with the centrifugal filter and the recirculating assembly. To place the apparatus in the second configuration, the base section is removed from the container and positioned in its operating position. The containing member is placed on the base section, and the centrifugal filter and the recirculating assembly are positioned in their operating position. Then power is supplied to the pump and/or drive components to cause the solvent to be recirculated, and also to cause the centrifugal filter to rotate. Thus, the solvent is delivered from the wash basin to the centrifugal filter where the contaminating matter is removed, and the purified solvent being collected in the reservoir. Then the recirculating assembly recirculates the solvent back up to the wash basin. Other features of the present invention will become apparent from the following detailed description.

DESCRIPTION OF THE PREFERRED EMBODIMENTS

Figure 1:
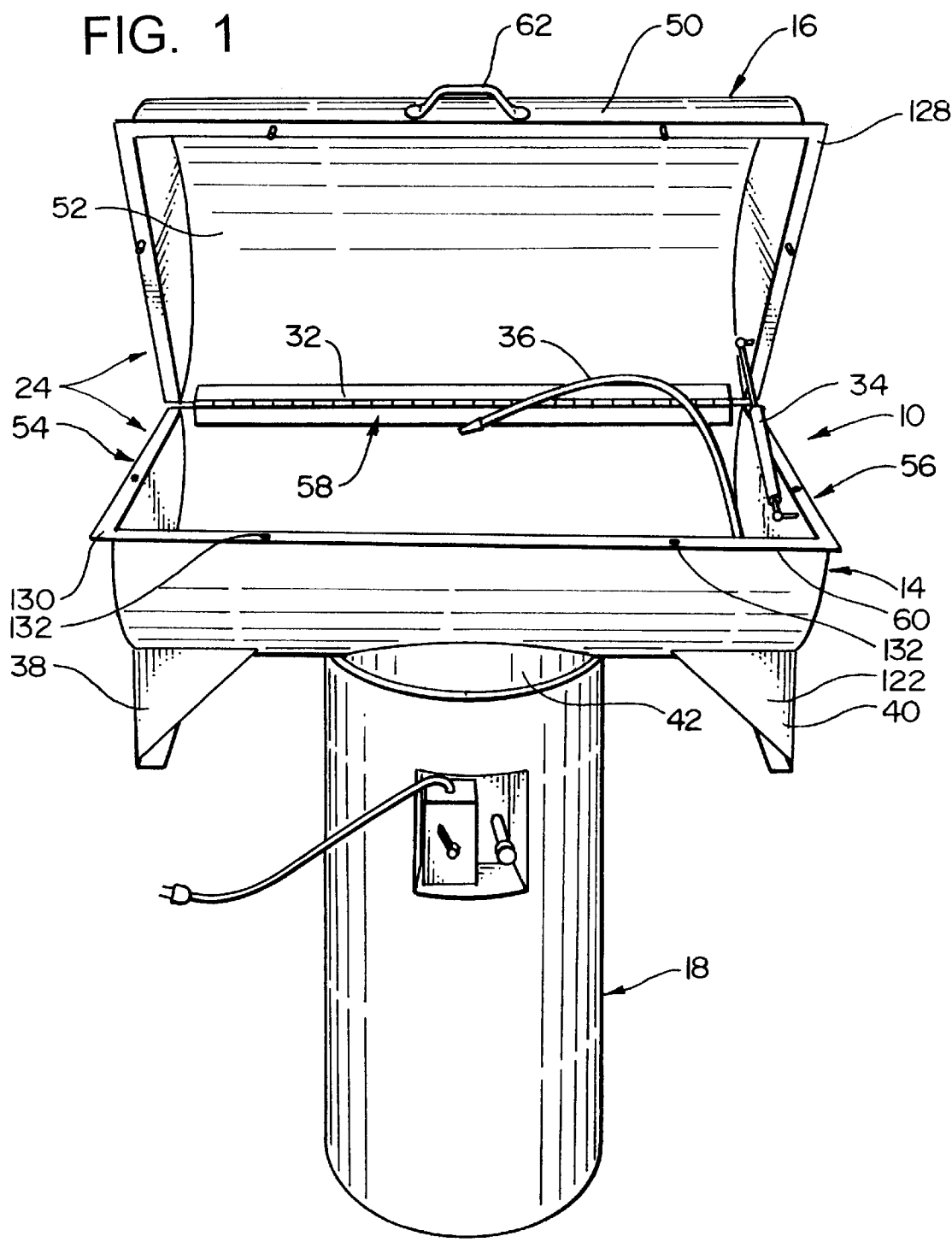
FIG. 1 is a front perspective view of the preferred embodiment of the portable parts washing apparatus as it appears when set up for use a parts washer.

The primary design features of the portable parts washing apparatus 10 that distinguishes it from the parts washers currently on the market is its design for portability and its use of a novel centrifugal filter assembly 12 first described in the parent of this application. The portable parts washing apparatus 10 has a first or parts washing operating position shown in FIG. 1.

In this position, the portable parts washing apparatus 10 has a parts washing basin 14 with an attached cover 16 that rests on a base assembly 18 containing a solvent transport means 20, the centrifugal filter assembly 12, and a solvent reservoir 22. In this configuration, the portable parts washing apparatus 10 resembles a conventional parts washer and is used in much the same way.

Figure 3:
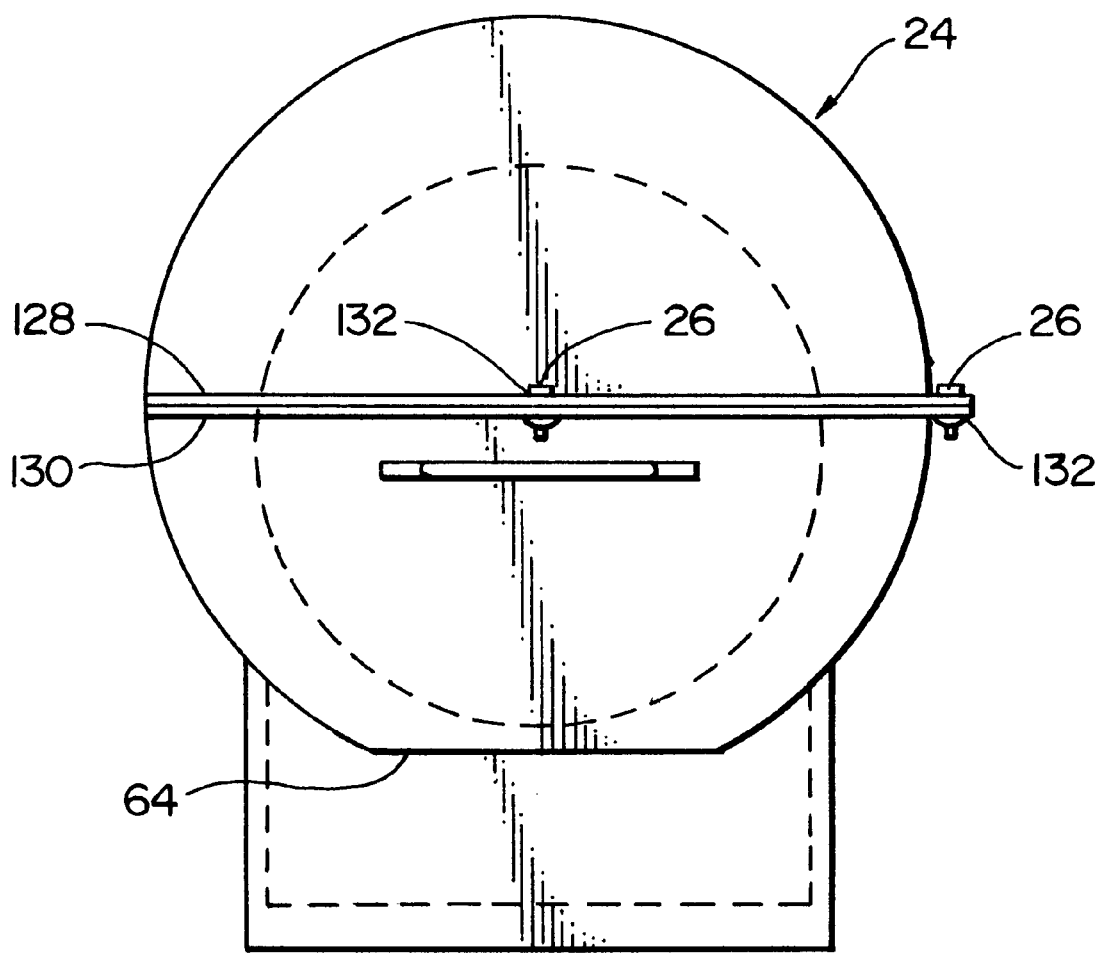
FIG. 3 is a side elevational view of the portable parts washing apparatus as configured for transport and showing the approximate position of the solvent reservoir in a circular dashed line.
Figure 7:
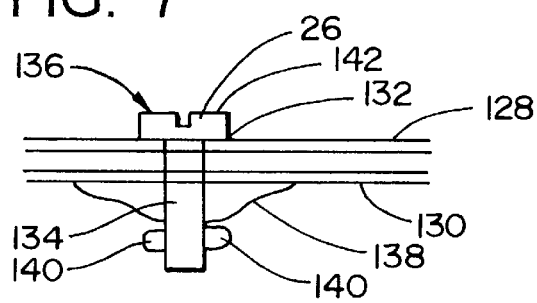
FIG. 7 is a schematic drawing of the one-quarter turn fasteners used to secure the cover to the washing basin.

In the second or transport operating position, which is shown from the side in FIG. 3, the parts washing basin 14 and the cover 16 form a container assembly 24 into which the base assembly 18 is placed for transport. Once the base assembly 18 is in position inside the washing basin 14, the cover 16 is lowered and secured with a plurality of fasteners 26, as shown in FIGS. 3 and 7. The portable parts washing apparatus 10 may now be moved as a single unit to any location desired. In the transport operating position (FIG. 3), the portable parts washing apparatus 10 has all is primary operational parts safely secured within the steel container assembly 24. There is little chance of damage to the portable parts washing apparatus 10 and the solvent 28 is protected against spillage by both the base assembly 18 and the container assembly 24.

The second major design feature of the portable parts washing assembly is the use of a centrifugal filter assembly 12 to filter the solvent 28 during use. This has the benefit of enabling a long useful life for the solvent 28 and, very importantly for this application, removes most of the foreign matter washed from the parts from the solvent thus inhibiting the build up of sludge in the bottom of the solvent reservoir 22. Since most of this waste is removed from the solvent 28 before the transport of the portable parts washing apparatus 10, the contaminants will not be remixed into the solvent 28 every time the portable parts washing apparatus 10 is moved. This means that the portable parts washing apparatus 10 is available for use as soon as a filter 30 is reinserted into the centrifugal filter assembly 12 without having to replace the solvent 28 every time the unit 10 is moved.

The preferred embodiment of the portable parts washing apparatus 10 of the present invention will now be described. In FIG. 1, the portable parts washing apparatus 10 is shown in the parts washing operating position. There is a container assembly 24 that is comprised of a parts washing basin 14, a cover 16 attached to a rear edge of the parts washing basin 14 by a piano hinge 32, a support 34 to keep the cover 16 up during the operation of the portable parts washing apparatus 10, a solvent directional means 36 to direct the flowing solvent 28 over the dirty part, a left support leg 38, a right support leg 40, and a collar 42 attached concentrically with an aperture 44 formed in a base wall 46 of the washing basin 14 that acts as a solvent drain 48.

Figure 2:
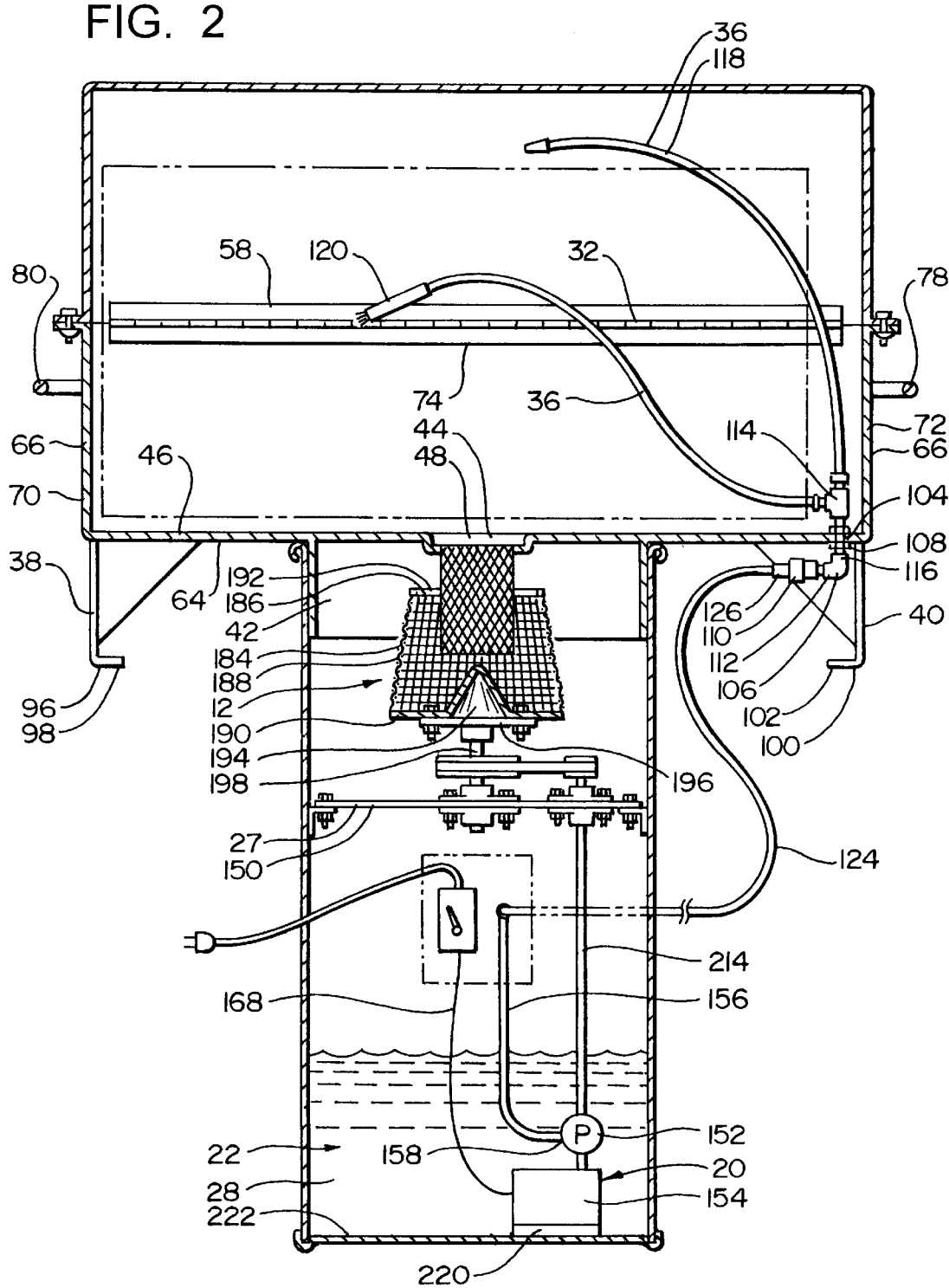
FIG. 2 is a cross-sectional view of the preferred embodiment of the portable parts washing apparatus taken along line 2—2 found in FIG. 1.

As seen in FIG. 2, the cover 16 is generally semi-circular in cross section and has an exterior surface 50, an interior surface 52, a left side 54, a right side 56, a rear edge 58, and a front edge 60. A handle 62 is attached, for instance by welding, near the front edge 60 and preferably centered on the exterior surface 50 of the cover portion 16. The handle 62 is preferably not as wide as an average human hand, so the user will not be tempted to use the handle 62 to lift the cover portion 16 during the assembly of the portable parts washing apparatus 10 to lift the container assembly 24, but will use the handle 62 to open the cover 16 for use.

The washing basin portion 14 is also generally semi-circular in cross section, but has generally planar sink bottom 64 that truncates the lowest portion of the semi-circular shape. The washing basin portion 14 has an exterior surface 66, an interior surface 68, a left side wall 70, a right side wall 72, a rear edge 74, and a front edge 76. A handle 78 is attached, for instance by welding, to the exterior surface 66 of the right side wall 72, as is a handle 80 to the exterior surface 66 of the left side wall 70. The right side handle 78 and the left side handle 80 are preferably large enough so that a typical adult can grasp the handle with both hands, Unlike the handle 62 attached to the cover 16, the handles 78, 80 connected to the right 72 and left 70 side wall are intended to support the weight of the portable parts washing apparatus 10 when it is being transported is from place to place.

The rear edge 74 of the cover portion 16 is attached for pivotal movement to the rear edge 58 of the wash basin portion 14 by a piano hinge 62. A ball joint stud 82 is attached to the right side wall 72 of the cover portion 16 and a second ball joint stud 84 is attached to the right side wall 56 of the washing basin 14. The studs 82, 84 both have a rounded ball portion 86 at their distal ends 88. These ball portions 86 are engaged respectively by a ball joint on a top end 90 and a bottom end 92 of a gas filled piston 94. When the portable parts washing apparatus 10 is in use, the piston 94 holds the cover portion 16 open in relation to the washing basin 14. However, if a fire should erupt in the parts washer 10, the upper ball stud 82 is partially made from a metal the melts well below the temperature of a solvent fire. This disconnects the upper portion 90 of the piston 94 from the right side wall 72 allowing the cover 16 to fall and smother the fire. This upper ball joint stud 82 is a form of a fusible link know in the industry.

Attached, for example by welding, to the outer surface of the washing basin 14 is a left leg portion 38 and a right leg portion 40. A collar portion 42 concentrically surrounds the drain 48. The left leg portion 38, the right leg portion 40, and the collar 42 all extend downwardly to the same point so that all three portions 38, 40, 42 will support the weight of the container assembly 24 and anything placed inside it when it rests on the ground. The lower edge 96 of the left leg portion 38 forms foot 98 that extends perpendicularly toward the center of the parts washing basin 14. Similarly, the lower edge 100 of the right leg portion 40 forms foot 102 that extends perpendicularly toward the center of the parts washing basin 14.

An aperture 44 is formed in approximately the center of the planar sink base 46 for a solvent outlet, or drain 48. A second aperture 104 is formed near the right side 56 as a solvent inlet 104. The placement of the solvent inlet 104 is not critical, but it must not interfere with the placement of the base assembly 18 when the portable parts washing apparatus 10 is configured for transport. A ninety degree hydraulic elbow fitting 106 is secured in the solvent inlet aperture 104 by a pair of nuts, washers and solvent-resistant gaskets 108. A quick-disconnect female hydraulic fitting I 10 is attached to the lower portion 112 of the ninety degree hydraulic elbow 106. A T-connector 114 is attached to the upper portion 116 of the ninety degree hydraulic elbow 106 that is inside the wash basin 14. A flexible metal nozzle 118 is attached to the one side of the T-connector 114 and a hose with a flow-through brush 120 is attached to the other side of the T-connector 114. Both of the nozzle 118, and the hose and brush 120 combination are commonly used on parts washers and are know by those knowledgeable in the art. A feature of the preferred design is that the ninety degree hydraulic fitting 106 and female quick disconnect fitting I 10 are mostly protected against impact because of its placement in the cavity formed by the right side leg 40 and its front and back braces 122. In this position, it is easily accessible for hookup with a basin supply hose 124 with a male hydraulic quick disconnect fitting 126 on each end, while at the same time being relatively protected from any side impact.

A radially extending flange 128 extends perpendicularly outward from the cover portion 16 along its left side edge 54, right side edge 56 and front edge 60. A corresponding radially extending flange extends perpendicularly outward from the wash basin 14 portion along its left side edge 70, right side edge 72 and front edge 76. When the cover portion 16 is closed, the flanges 128, 130 align as shown in FIG. 3. A plurality of apertures 132 are formed in the cover flange 128 with a corresponding plurality of apertures 132 axial aligned in the washing basin 14 flange 130.

As shown in FIG. 7, the shaft portion 134 of a one-quarter turn fastener 136 is permanently, but rotatably attached to the cover flange 128 while the spring portion 138 of the quarter turn fastener 136 is permanently attached to the washing basin flange 130. When the cover 16 is closed and the two flanges 128,130 meet, the shaft portion 134 of the one-quarter turn fastener 136 extends through the aperture 132 in the cover flange 128, the aperture 132 in the washing basin flange 130, and an aperture 132 the spring portion 138 of the fastener 136. Turning the shaft portion 134 of the one quarter turn fastener 136 approximately one-quarter revolution with a screwdriver causes the cams 140 on the shaft portion 134 to engage the spring portion 138 from its underside to compress the spring portion 138 against the lower surface of the wash basin flange 130. The head 142 on the shaft portion 134 of the one-quarter turn fastener 136 correspondingly compresses against the upper surface of the cover flange 128. This secures the upper flange 128 to the lower flange 130.

The sink bottom wall 46 has an underside portion 144 located opposite the side that is contained in the basin portion 146. Attached to this sink underside portion 144, surrounding the drain 48, is the downwardly extending collar 42. The collar 42 serves to position the parts washing basin 14 on the base assembly 18, to act as a splash guard for the solvent 28 while it is being centrifuged. It also acts as a support in tandem with the right 40 and left 38 side legs when the portable parts washing apparatus 10 is configured for transport and resting on the ground or other surface.

In the parts washing position (FIG. 1), the container assembly 24 rest on a base assembly 18 with an upper rim 148 of the base assembly 18 supporting the container assembly 24 by a lower side of the container base wall 144. Referring to FIG. 2, mounted inside the base assembly 18 by a bracket 150 is a centrifugal filter assembly 12 and a solvent transfer means 20. The centrifugal filter assembly 12 is positioned by the bracket 150 to be directly below the solvent drain 48 in the parts washing basin 14. There is also a solvent transport means 20 mounted inside the base assembly 18. The solvent transfer means 20 is comprised of a pump 152, a drive motor 154 that powers the pump 152 and the centrifugal filter assembly 12, a solvent supply hose 156 attached to an outlet 158 of the pump 152, a washing basin supply hose 124 and the solvent directional means 36. In the preferred embodiment, the solvent directional means 36 is comprised of a flexible metal nozzle 118 and a brush 120 in communication with a solvent hose through which the solvent flows. Both of these solvent directional means are well know in the art. The base assembly also forms the solvent reservoir that contains the solvent for distribution by the pump. The base assembly 18 also includes a cap 160 with a compression ring 162 that is used to seal the base assembly against leakage of the solvent 28 during transport.

The base assembly is fabricated from an industry standard thirty-five gallon steel drum 161 modified to include a recessed housing 163 in the side of the drum 161. This recessed housing 163 is preferably made from the same material as the drum 161 and in the preferred embodiment is fabricated and attached to the steel drum 161 by welding to form a liquid tight seal. An electrical box 164 used for water resistant applications is mounted to a rear of the recessed housing 163 where a bulkhead fitting 166 (See FIG. 6) extends through the steel drum 161 into its interior. The electrical wires 168 from the motor 154 are placed through this solvent resistant bulkhead fitting 166 into the electrical box 164 where they are wired in series with a single pole electrical switch 170 and a pig tail 172. The pig tail 172 extends from a top wall of the electrical box 164 and has a standard three prong electrical plug 174 at its end that can be plugged into any standard three wire electrical extension cord.

The recessed housing 163 also contain a supply outlet 176 for the solvent 28. A female quick disconnect type hydraulic fitting 178 is mounted to the back wall of the recessed housing 162 next to the electrical box 164. The male attachment end 180 of the female quick disconnect 178 extends through the wall 182 of the recessed housing 162 into the interior of the base assembly 18 where its is joined to the solvent resistant supply hose 156 that is attached to the outlet side 158 of the pump 152. A significant design benefit provided by this recessed housing 162 is the protection of both the solvent outlet quick connect 178 and the electrical box 164 and switch 170 from most damaging impacts.

The centrifugal filter assembly is mounted to the base assembly 18 with a mounting bracket 27, so that a filter receptacle 184 is positioned directly below the drain 18. The centrifugal filter assembly 12 is comprised of a filter receptacle 184 with an open top end 186, a perforated circumferential side wall 188, and a base 190. The filter receptacle 184 is preferably made from a stainless steel mesh supported by an upper collar 192 and the lower filter receptacle base 190, although other solvent resistant metals and plastics may also be used. The filter receptacle base 190 at its center has an interior upward facing cone shaped imperforate portion 194 that is surrounded by the filter side wall 188 and an exterior downward facing portion 196. Attached to the downward facing portion 196 is a filter shaft 198.

Figure 6:
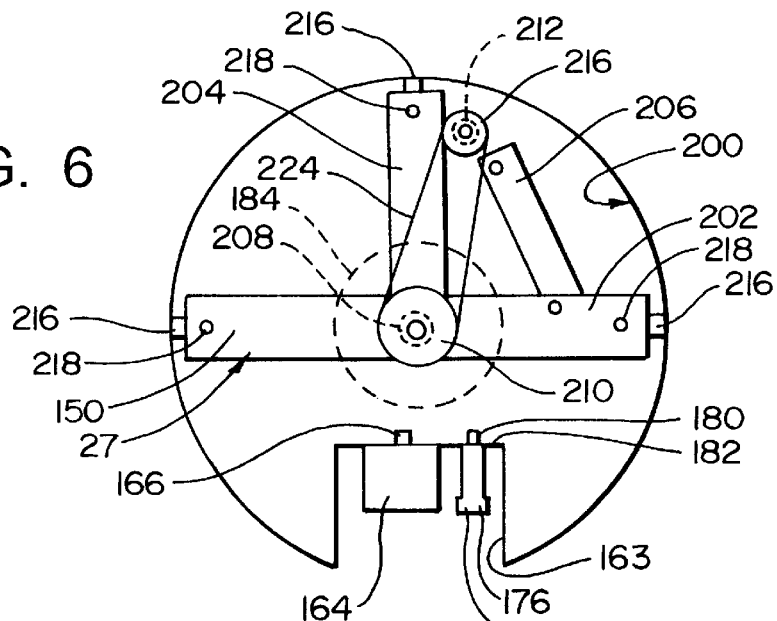
FIG. 6 is a schematic drawing of the mounting bracket.

The centrifugal filter assembly 12 is mounted to the interior surface 200 of the base assembly 18 using the bracket 27 shown schematically in FIG. 6. The mounting bracket 27 is comprised of a longitudinal member 202, a transverse member 204, and a bracing member 206. A sealed bearing 208 is attached coaxial with a opening formed near the center in the longitudinal member 202. The filter shaft 198 is placed within the sealed bearing 208 for rotational movement. A filter pulley 210 is attached to the filter shaft 198. A second sealed bearing 212 is mounted between the transverse member 204 and the bracing member 206 A motor shaft 214 with a pulley 216 on its top end descends through the sealed bearing 212 where it is attached to the impeller shaft of a pump motor 154. In FIG. 2, the attachment of the mounting bracket 27 to the base assembly 18 is shown. A support bracket 216 is attached, for instance by welding, to the interior of the base assembly 18. Each bracket 216 has a hole 218 for axial alignment with holes in the ends of the longitudinal member 202 and the transverse member 204 of the mounting bracket 27. With all the centrifugal filter assembly 12 and the solvent transfer means 20 attached to the mounting bracket 27, the bracket 27 is lowered into the base assembly 18 and bolted to the brackets 216. To minimize vibration, the pump will preferably rest on a resilient solvent resistant pad 220 on the bottom of the solvent reservoir 222.

The motor shaft pulley 212 and the filter shaft pulley 210 are interconnected with a belt 224 so that, when energized, the motor 154 will spin the filter receptacle 184 about an axis 228 with a generally vertical orientation drawn outwardly from the interior cavity of the filter receptacle 184. Of course, the size of the pulleys 210, 212, and the rated speed of the motor 154 will control the rate of rotation of the filter receptacle 184. The faster this rate of spin, the greater the centrifugal force that will be exerted on the solvent entering the filter receptacle 184. Preferably, the filter receptacle 184 will spin at approximately 400 to 500 revolutions per minute. At this rate of spin, the solvent is separated from the foreign waste materials without propelling the solvent upwardly toward drain or unnecessarily atomizing it. The preferred embodiment uses a common pump 152 and motor 154 (Little Giant 3E/4E ⅕ hp) that has been modified to drive both the pump 152 and the centrifugal filter assembly 12 at the same time. The modification to the motor 154 involves using a collar to co-axially attach the extended pulley drive shaft 214 extending to the motor shaft driving the pump impeller. The electrical cover of the pump motor is also reverse one hundred eighty degrees to put the pumps electrical cord into a more convenient position. Using this slightly modified pump for both the pump 154 and the centrifugal filter assembly 12, significantly reduces the complexity and cost of manufacturing the invention.

As an example of the construction of the portable parts washing apparatus 10, the container assembly 24 with cover 16 joined to washing basin 14 that has an eighteen inch (18") diameter and a twenty-nine inch (29") length. The total height of the container assembly 24 is twenty-one inches (21") including the height of the left leg 38, right leg 40, and collar 42. The steel drum. used for the base assembly 18 has a fourteen and one-half inch (14½") diameter and a twenty seven inch (27") height. Of course, the portable parts washing assembly 10 can be scaled either up or down depending on the application. For instance, a standard 55 gallon drum could be used for the base assembly if the container assembly was scaled upward accordingly.

Figure 4:
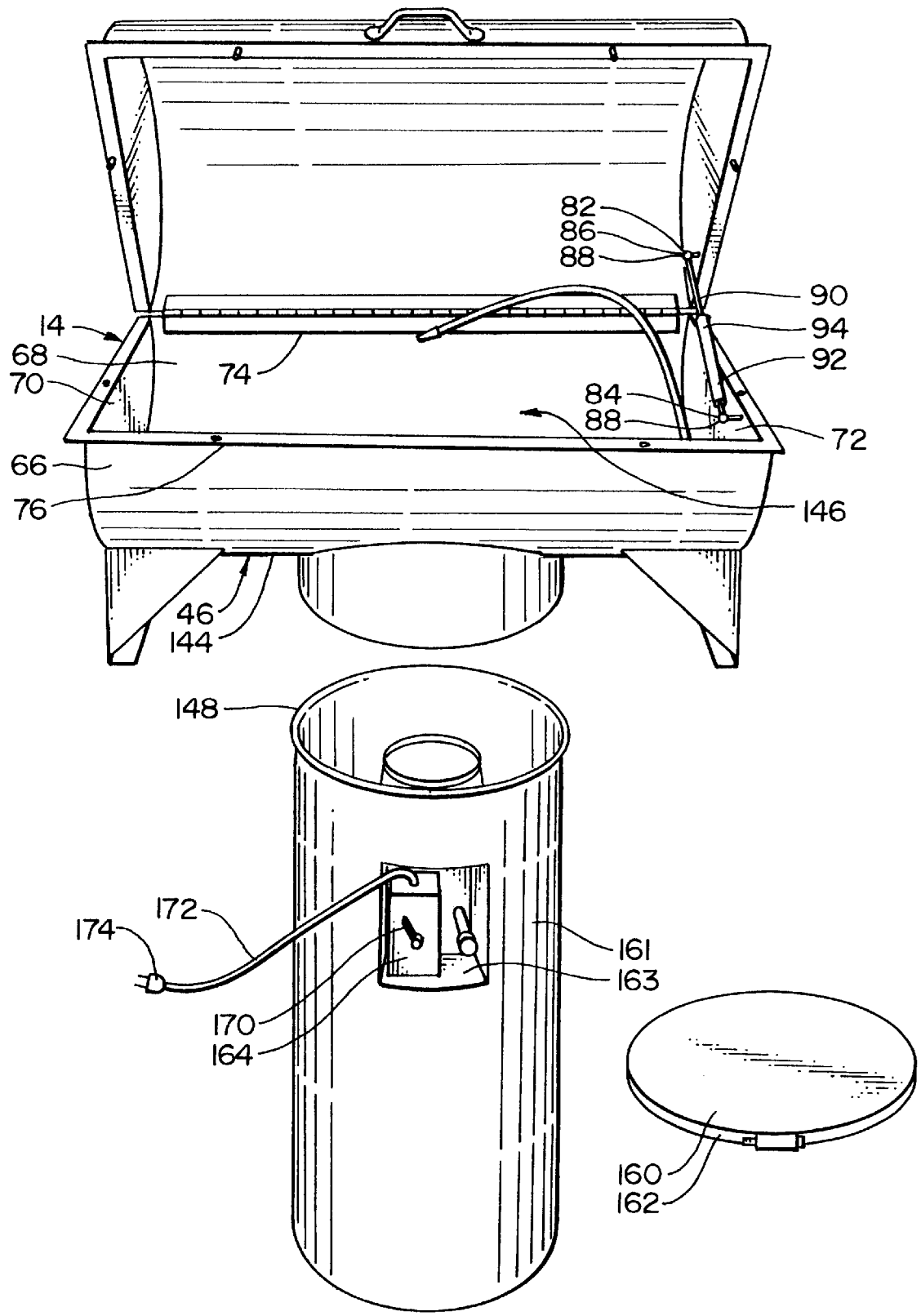
FIG. 4 is partially exploded view of the portable parts washing apparatus indicating the two primary components of the portable parts washing system.
Figure 5:
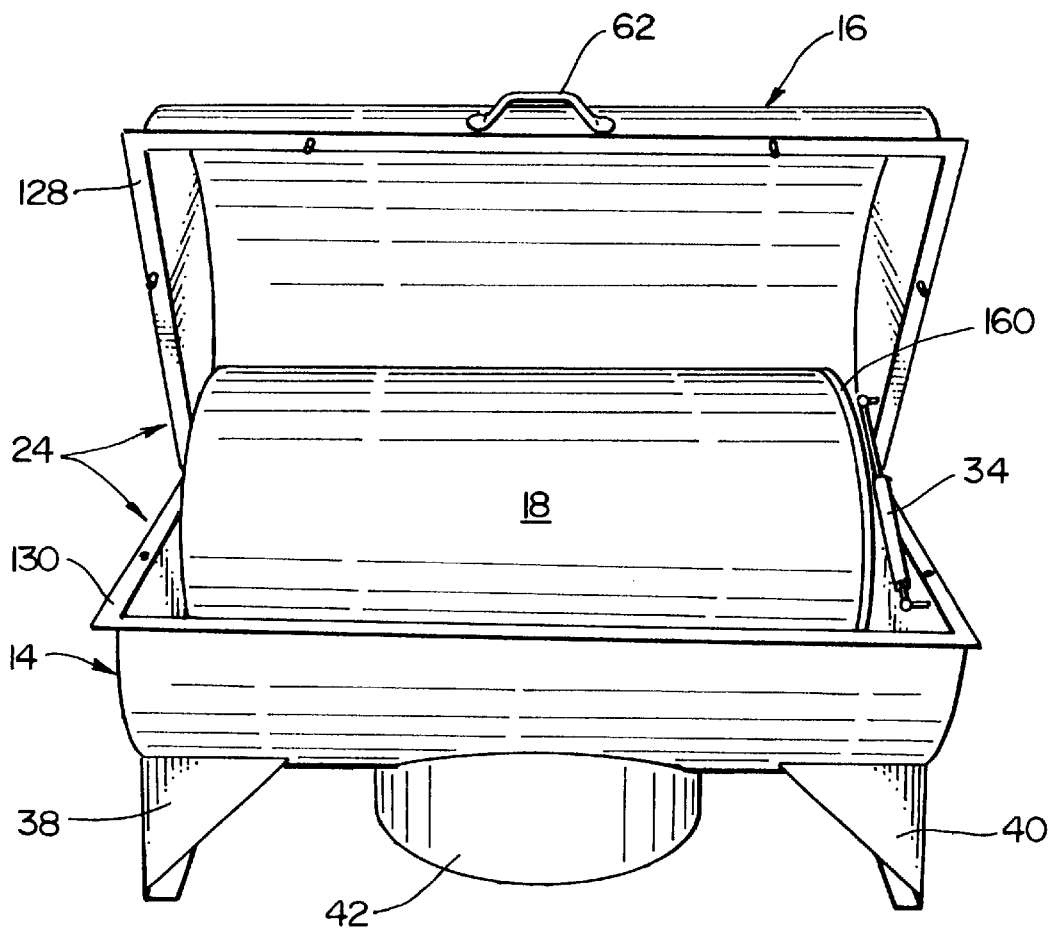
FIG. 5 is a front plan view of the portable parts washing apparatus with the solvent reservoir assembly capped and placed in the container assembly in preparation for transport.

The assembly of the portable parts washing apparatus 10 into the parts washing configuration and then its disassembly into the transport configuration will now be described. Referring to FIGS. 3 and 7. each of the one-quarter turn fasteners 136 is turned one quarter revolution using a standard slotted screw driver. This releases the cams from the spring portion of the connector and frees the cover 16 for upward movement. In FIG. 4, the cover 16 is lifted and the base assembly 18 is removed and placed of the ground. The cap 160 of the base assembly has been removed by loosening the compression ring 162 that secures it to the steel barrel. A filter bag 226 is inserted into the centrifugal filter 184.

Using the side handles 78, 80 (FIG. 3), the container assembly 24 is lowered onto the base assembly 18 with the collar 42 inside the barrel and the basin base wall supported by the rim 148 of the base assembly 18. The basin supply hose 124 is then removed from its storage in the washing basin 14 of the container assembly 24 and attached to the solvent supply quick disconnect 178 located in the recessed housing 163. The other end of the basin supply hose 124 is then connected to the quick disconnect located at the solvent inlet I 10 to the washing basin 14. The pig tail 172 is then plugged into an extension cord. The pump and centrifugal filter can then be turned on for operation using the switch 170. Disassembly of the portable parts washing assembly 10 is essentially the reverse of the procedure just described. It should be noted that since the basin supply hose 124 and the quick disconnect fittings 126, 1107 178 are designed for hydraulic use, they will not leak solvent when removed from their complementary fittings. It is also desirable to remove the filter bag 226 during disassembly to prevent the waste materials from being reintroduced into the solvent 28.

When in use, the pump 154 pumps solvent 28 from the solvent reservoir 22, through the solvent supply hose 156, the basin supply hose 124 and the solvent direction means 36 (through the intermediate hydraulic fittings 126, 110, 178). From the brush 120 and nozzle 186 assembly 36, the solvent 28 is directed over a part to be cleaned that is placed in the parts washing basin 14. As the part is washed, the solvent is contaminated with foreign matter. This contaminated solvent flows from the parts washing basin 14, through the drain 48, into the spinning centrifugal filter receptacle 184. The spinning action of the centrifugal filter receptacle 184 employs centrifugal force to drive the solvent through a disposable filter element 226, after which the solvent falls back into the solvent reservoir 22. In this way, the recirculation of the solvent in the portable parts washing apparatus 10 provides a continuous flow of filtered solvent through the nozzle and hose assembly 36 to the parts washing basin 14 for the washing of dirty parts, while both drying and containing most the waste from the dirty part in the disposable filter element 226.

Figure 8:
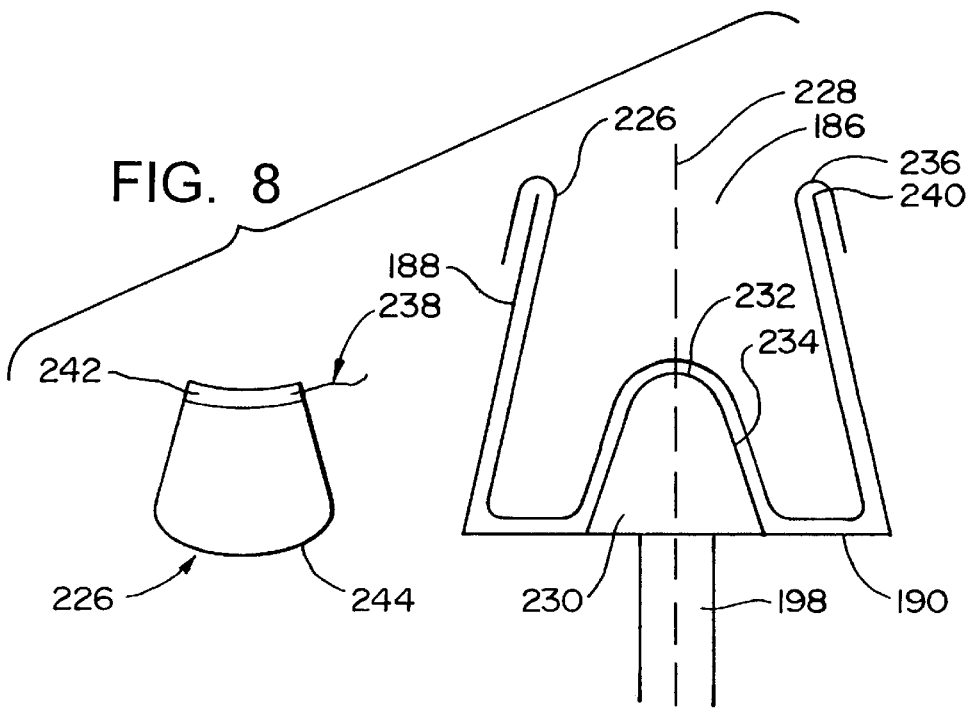
FIG. 8 is a schematic drawing of the filter bag draped in the filter basket.

In the preferred embodiment, two design features enable the filter receptacle to more efficiently use centrifugal force to separate the solvent from the waste. The first modification helps retain the solvent inside the filter receptacle until centrifugal force draws it through the filter media and the perforated side walls. Referring to FIG. 8, this is done by slightly slanting the mesh side wall 188 is shaped in a frusto-conical configuration upwardly and inwardly from the base to the open top end 186. This upward and inward slant is preferably to 12 to 14 degrees from vertical inwardly toward a generally vertical axis 228.

The second design feature employs a deflecting member 230 that has a top rounded center portion 232 and a downwardly extending skirt 234 that slants outwardly from the vertical axis 228. The deflecting member 230 is attached to, or formed integrally from, the center of the interior upward facing portion of the base member 190. The purpose of the deflecting member 230 is to direct the solvent outwardly toward the side wall 188 and away from the center of the filter receptacle 184 where the centripetal acceleration approaches zero and the solvent is less likely to be affected by the corresponding centrifugal force. During normal use, a disposable filter element 226 is draped inside the filter receptacle 184. The upper open portion 236 of the disposable filter element 226 contains a securing means 238 that is folded over the top edge 240 of the filter receptacle 184. The securing means 238, for instance, can be a string or elastic fiber that is sown into a channel 242 on the upper portion of the disposable filter element 226. The lower closed portion 244 of the filter element 226 drapes over the deflecting member 230.

Preferably, the disposable filter element 226 is approximately the same size and shape as the interior of the filter receptacle 184, so that, when the filter receptacle 226 is spinning, the walls of the disposable filter element 226 will cling to the filter side wall 188. The disposable filter element 226 is preferably made from a fine mesh linen cloth, although other filter media would work, for instance, a heavy, permeable paper filter. The preferred embodiment of the invention presently uses a 100 micron mesh linen for its filter media. Because of the centrifugal force placed on the disposable filter element 226 during its use, the disposable filter element 226 and its contents should be mostly free of solvent. The used disposable filter element 226 can be placed in a container to be processed by a solvent service provider when it has reached the end of its useful life. This relatively small volume of hazardous waste material can be sealed in a small and light container that is mostly free of solvent and that can easily and safely be transported to a hazardous waste processing plant. The solvent remains relatively free of contaminants and may be re-used for a much greater length of time than is now possible under the state of the art.

Figure 9:
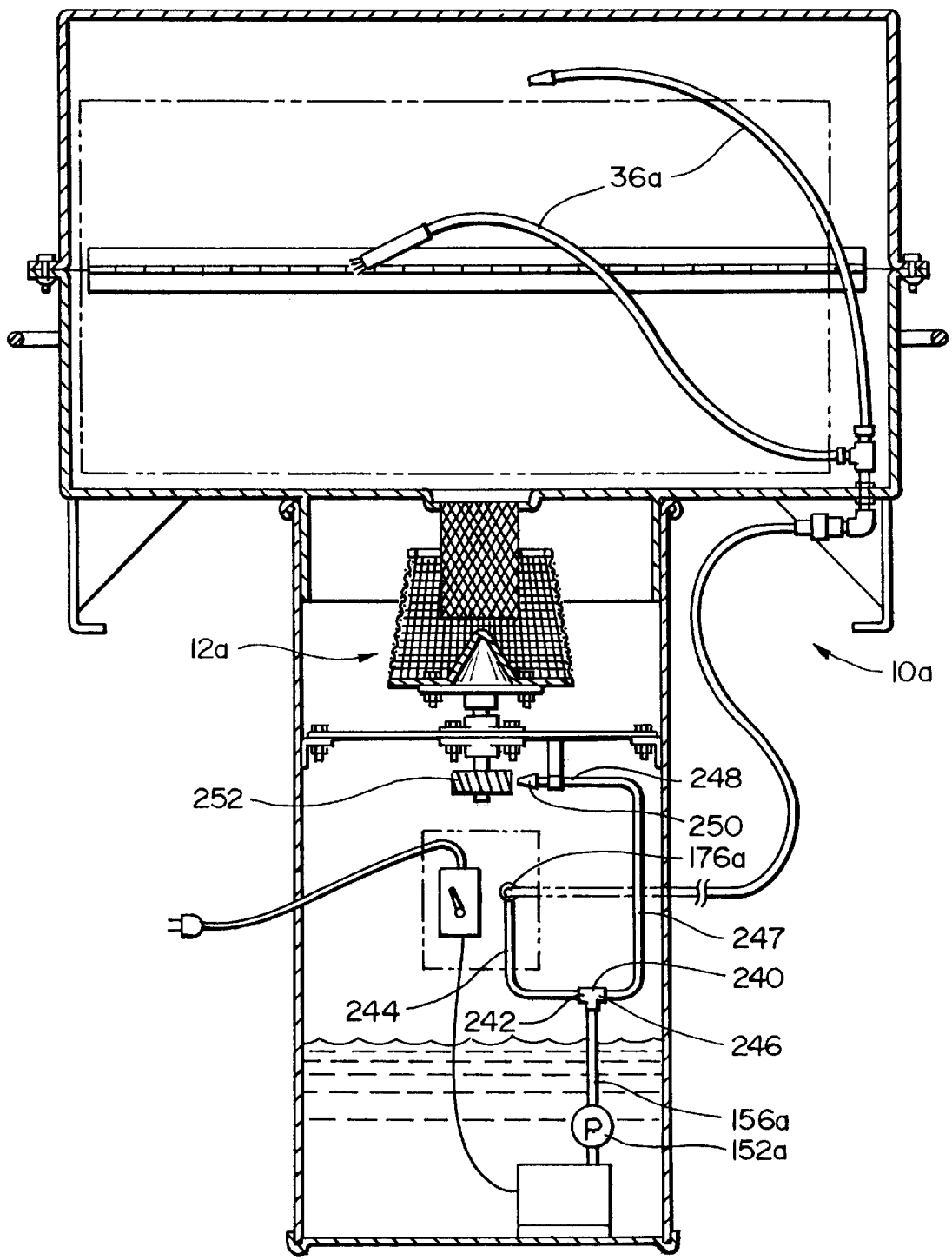
FIG. 9 is a view sectional view of a second embodiment showing a modified design of the base assembly.

A second embodiment of the present invention is shown in FIG. 9. Components of this second embodiment which are similar to components of the first embodiment will be given like numerical designation, with an "a" suffix distinguishing those of the second embodiment.

This second embodiment 10*a* is substantially similar to the first embodiment, except that the motive power to rotate the centrifugal filter assembly is modified. More specifically, instead of having a drive connection through the drive shaft 214 to the pulley 212 to rotate the pulley 210, as in the first embodiment, there is provided a turbine which is driven from the output of the pump 152*a*.

In this second embodiment, the line 156A from the pump 152*a* leads to a T-connection 240. This T-connection 240 has a left branch 242 that connects to a line 244 that in turn connects to the fitting 176*a*, which in turn connects through the line 124*a* to supply liquid to the outlet tubes 36*a* at the basin. The T also has a right branch 246 that connects through a line 247 to a tubular fitting that is mounted to the support assembly for the centrifugal filter assembly 12*a*. This fitting 248 discharges liquid solvents through a nozzle 250, with the liquid solvent stream from the nozzle 250 impinging on a turbine 252 that is connected to a drive shaft 158*a* for the filter assembly 12.

In operation, when electric power is directed to the motor 154*a*, the pump 152*a* directs the liquid solvent under pressure to the T-fitting 240. Simultaneously, the liquid solvent is delivered through the line 244 to the fitting 176*a* to in turn supply liquid solvent through the outlet tubes 36*a* and to the basin.

At the same time, the liquid solvent is directed through the line 247 to the fitting 248 and through the nozzle 250 to rotate the turbine 252 and cause the centrifugal filter to rotate.

While this invention has been described in terms of a preferred embodiment, it is contemplated that persons reading the preceding description and studying the drawing will realize various alterations, permutations and modifications thereof It is therefore intended that the following appended claims be interpreted as including all such alterations and modifications as fall within the true spirit and scope of the present invention.

What is claimed:

1. A portable washing and filtering apparatus particularly adapted to wash parts, such as machine parts, said apparatus having a first stowed configuration in which the apparatus can conveniently be transported, and a second operating configuration in which washing of the parts can be accomplished with a washing solvent, and the solvent is filtered and recirculated in the apparatus, said apparatus comprising:

a. a containing section comprising a containing member defining a containing chamber, said containing member, functioning in the first configuration as a stowing container, and functioning in the second configuration as a wash basin having a parts and solvent containing region, said containing member having a drain configured to retain parts in the container and permit solvent to pass through the drain;

b. a base section which is configured to be positioned in the containing chamber of the containing member in the first stowed configuration, and also configured and arranged to function in the second operating position as a base support for the containing member and also a solvent reservoir, said base section defining a solvent containing region positioned below the containing section in the second configuration;

c. a centrifugal filter which in the first configuration is stowed in the containing member and in the second configuration is positioned to receive the solvent from the drain, said centrifugal filter comprising a rotatably mounted filter receptacle with filter to retain impurities from the solvent in the receptacle and permit the solvent to flow through the filter and into the solvent reservoir;

d. a recirculating assembly which comprises a pump and recirculating line and which is arranged so that in the operating configuration the pump moves the solvent from the solvent containing region and through the recirculating line to the wash basin of the containing member, and in the first stowed configuration is in the containing member.

2. The apparatus as recited in claim 1, wherein said containing section further comprises a cover member which in the stowed configuration functions as a cover for the containing member, and in the operating configuration is movable from an open position to a closed position to be above to be able to function as a flame suppresser.

3. The apparatus as recited in claim 1, wherein said containing member and said base section are interconnected in a manner that the containing member can be properly positioned on the base section in the operating configuration.

4. The apparatus as recited in claim 3, wherein said base section has an upper end opening, and the containing member has at its lower end a downwardly extending interfitting member which interfits with an upper end portion of the base section.

5. The apparatus as recited in claim 4, wherein said interfitting member comprises a circumferential collar fitting within the base section, and in the operating configuration said centrifugal filter is located in an area surrounded by said collar, so that solvent discharge from the centrifugal filter can be contained by said collar.

6. The apparatus as recited in claim 4, wherein said interfitting member extends downwardly from said containing member, and said containing member has a support extending downwardly from said containing member to properly support said containing member above a ground location.

7. The apparatus as recited in claim 1, wherein said centrifugal filter is mounted in said reservoir so that with the apparatus in its second operating configuration, the centrifugal filter is positioned in the base section beneath the drain of the containing member to receive the solvent from the drain, and said centrifugal filter is arranged to be able to remain in its position in the base section when the base section is removed from the containing member and stowed in the containing member.

8. The apparatus as recited in claim 1, wherein said pump comprises a pump motor, and said pump motor has an operative drive connection to said centrifugal filter to cause said centrifugal filter to rotate.

9. The apparatus as recited in claim 8, wherein said centrifugal filter is mounted to a mounting structure, and said motor has shaft means extending to said mounting structure, a drive connection extending between said shaft and said centrifugal filter to cause rotation of said centrifugal filter.

10. The apparatus as recited in claim 9, wherein said drive connection is a belt and pulley drive operatively interconnecting the shaft of the motor and the centrifugal filter.

11. The apparatus as recited in claim 1, wherein said centrifugal filter is provided with a fluid driven drive to cause rotation of said centrifugal filter, said pump being arranged with a fluid supply line to deliver solvent to said fluid drive to cause rotation of said centrifugal filter.

12. The apparatus as recited in claim 11, herein said fluid drive comprises a turbine means which is driven by solvent that is delivered from the pump.

13. A washing and filtering apparatus particularly adapted to wash parts, such as machine parts, where a washing solvent is recirculated and filtered in the apparatus, said apparatus comprising:
   a. a wash basin having a parts and solvent containing region and a drain configured to retain pats in the basin and permit washing solvent to pass through the drain;
   b. a centrifugal filter positioned to receive the solvent from the drain, said centrifugal filter comprising a rotatably mounted filter receptacle with a filter to retain impurities from the solvent in the receptacle and permit the solvent to flow through the filter;
   c. a base section providing a reservoir positioned to receive the filtered solvent from the centrifugal filter;
   d. a recirculating assembly comprising a pump to move the filtered solvent from the reservoir and a recirculating line to deliver the filtered solvent from the reservoir to the basin;
   e. said centrifugal filter being provided with a fluid drive to cause rotation of said centrifugal filter, said pump being arranged with a fluid supply line to deliver solvent to said fluid drive to cause rotation of said centrifugal filter.

14. The apparatus as recited in claim 13, wherein said centrifugal filter comprises a rotatably mounted receptacle structure and a replaceable filter element positioned within said receptacle structure, whereby impurities filtered from the solvent can be removed from the centrifugal filter by removing the replaceable filter element.

15. The apparatus as recited in claim 13, wherein said fluid drive means comprises a turbine means which is driven by solvent that is delivered from the pump.

16. The apparatus as recited in claim 13, wherein said fluid drive means comprises a turbine means which is driven by solvent that is delivered from the pump.

17. A method of operating a portable washing and filtering apparatus particularly adapted to wash parts, such as machine parts, by positioning the apparatus a first stowed configuration in which the apparatus can conveniently be transported, and also positioning the apparatus in a second operating configuration in which washing of the parts can be accomplished with a washing solvent, and the solvent is filtered and recirculated in the apparatus, said apparatus comprising:
   a. providing a containing section comprising a containing member defining a containing chamber;
   b. providing a base section which is configured to be positioned in the containing chamber of the containing member and positioning the base section in the containing chamber of the containing member in the first stowed configuration;
   c. positioning a centrifugal filter in the first configuration stowed in the containing member;

means to cause rotation of said centrifugal filter.

18. A method of operating a portable washing and filtering apparatus particularly adapted to wash parts, such as machine parts, by positioning the apparatus a first stowed configuration in which the apparatus can conveniently be transported, and also positioning the apparatus in a second operating configuration in which washing of the parts can be accomplished with a washing solvent, and the solvent is filtered and recirculated in the apparatus, said apparatus comprising:
   a. providing a containing section comprising a containing member defining a containing chamber;
   b. providing a base section which is configured to be positioned in the containing chamber of the containing member and positioning the base section in the containing chamber of the containing member in the first stowed configuration;
   c. positioning a centrifugal filter in the first configuration stowed in the containing member;
   d. positioning a recirculating assembly which comprises a pump and recirculating line in a stowed position in the containing member;
   e. initiating the operation of the apparatus in the second operating configuration by removing a base section from the containing chamber of the containing member and positioning the base section in its second operating position as a base support for the containing member and also utilizing the base section as a solvent reservoir, said base section defining a solvent containing region positioned below the containing section in the second configuration;
   f. also positioning the centrifugal filter in the second configuration where it is positioned to receive the solvent from the drain, said centrifugal filter comprising a rotatably mounted filter receptacle with filter to retain impurities from the solvent in the receptacle and permit the solvent to flow through the filter and into the solvent reservoir;
   g. positioning the recirculating assembly which comprises a pump and recirculating line, in the operating configuration so that the pump moves the solvent from the solvent reservoir of the base section.

19. A washing and filtering apparatus particularly adapted to wash parts, such as machine parts, where a washing solvent is recirculated and filtered in the apparatus, said apparatus comprising:
   a. a wash basin having a parts and solvent containing region and a drain configured to retain pats in the basin and permit washing solvent to pass through the drain;
   b. a centrifugal filter positioned to receive the solvent from the drain, said centrifugal filter comprising a rotatably mounted filter receptacle with a filter to retain impurities from the solvent in the receptacle and permit the solvent to flow through the filter;
   c. a base section providing a reservoir positioned to receive the filtered solvent from the centrifugal filter;
   d. a recirculating assembly comprising a pump to move the filtered solvent from the reservoir and a recirculating line to deliver the filtered solvent from the reservoir to the basin, said pump comprising a pump motor to drive said pump, said pump motor also having an operative drive connection to said centrifugal filter to cause said centrifugal filter to rotate whereby operation of said pump motor causes said pump to operated and at the same time cause the centrifugal to rotate.

20. The apparatus as recited in claim 19, wherein said centrifugal filter is mounted to a mounting structure, and said motor has a shaft extending to said mounting structure, a drive connection extending between said shaft and said centrifugal filter to cause rotation of said centrifugal filter.

21. The apparatus as recited in claim 20, wherein said drive connection is a belt and pulley drive operatively interconnecting the shaft of the motor and the centrifugal filter.

* * * * *